United States Patent
Mian et al.

(10) Patent No.: US 9,759,628 B2
(45) Date of Patent: Sep. 12, 2017

(54) AREA MONITORING FOR DETECTION OF LEAKS AND/OR FLAMES

(71) Applicant: International Electronic Machines Corporation, Troy, NY (US)

(72) Inventors: Zahid F. Mian, Loudonville, NY (US); Ronald W. Gamache, East Greenbrush, NY (US); Nicholas Glasser, Troy, NY (US)

(73) Assignee: INTERNATIONAL ELECTRONIC MACHINES CORPORATION, Troy, NY (US)

( * ) Notice: Subject to any disclaimer, the term of this patent is extended or adjusted under 35 U.S.C. 154(b) by 31 days.

(21) Appl. No.: 14/605,945

(22) Filed: Jan. 26, 2015

(65) Prior Publication Data

US 2015/0168249 A1   Jun. 18, 2015

Related U.S. Application Data

(63) Continuation of application No. 12/840,607, filed on Jul. 21, 2010, now Pat. No. 8,941,734.

(Continued)

(51) Int. Cl.
*H04N 7/18*      (2006.01)
*G01M 3/04*    (2006.01)
(Continued)

(52) U.S. Cl.
CPC ........... *G01M 3/04* (2013.01); *G08B 13/1672* (2013.01); *G08B 13/193* (2013.01);
(Continued)

(58) Field of Classification Search
CPC ....... G08B 17/12; G08B 17/125; G08B 19/00
USPC .............. 382/181, 100; 356/5.01, 437, 300; 340/578, 577, 525, 621, 605; 250/554, 250/372, 339.15, 338.1, 330; 348/222.1, 348/169, 154, 143; 73/649, 592, 587, 73/570, 49.8; 702/8, 51
See application file for complete search history.

(56) References Cited

U.S. PATENT DOCUMENTS 4,701,624 A   10/1987 Kern et al.
5,339,070 A    8/1994 Yalowitz et al.
(Continued)

OTHER PUBLICATIONS

Office Action for U.S. Appl. No. 12/840,607, Oct. 10, 2010 with 32 pages.

(Continued)

*Primary Examiner* — Nhon Diep
(74) *Attorney, Agent, or Firm* — Labatt, LLC

(57) ABSTRACT

A solution for monitoring an area for the presence of a flame and/or a leak, such as from a pressurized fluid, is provided. An imaging device can be used that acquires image data based on electromagnetic radiation having wavelengths only corresponding to at least one region of the electromagnetic spectrum in which electromagnetic radiation from an ambient light source is less than the electromagnetic radiation emitted by at least one type of flame for which the presence within the area is being monitored. An acoustic device can be used that is configured to acquire acoustic data for the area and enhance acoustic signals in a range of frequencies corresponding to a leak of a pressurized fluid present in the area.

20 Claims, 13 Drawing Sheets

Related U.S. Application Data

(60) Provisional application No. 61/213,877, filed on Jul. 23, 2009.

(51) Int. Cl.

| | | |
|---|---|---|
| *G08B 17/12* | (2006.01) | |
| *G08B 13/16* | (2006.01) | |
| *G08B 13/193* | (2006.01) | |
| *G08B 13/196* | (2006.01) | |
| *H04N 5/33* | (2006.01) | |
| *G08B 19/00* | (2006.01) | |

(52) U.S. Cl.
CPC ......... *G08B 13/196* (2013.01); *G08B 17/125* (2013.01); *H04N 5/33* (2013.01); *H04N 7/18* (2013.01); *G08B 19/00* (2013.01)

(56) References Cited

U.S. PATENT DOCUMENTS

| | | | |
|---|---|---|---|
| 5,533,383 A | 7/1996 | Greene et al. | |
| 5,625,342 A | 4/1997 | Hall et al. | |
| 5,677,532 A * | 10/1997 | Duncan et al. | 250/339.15 |
| 5,726,632 A | 3/1998 | Barnes et al. | |
| 5,937,077 A * | 8/1999 | Chan et al. | 382/100 |
| 6,011,464 A * | 1/2000 | Thuillard | G08B 29/186 340/506 |
| 6,184,792 B1 | 2/2001 | Privalov et al. | |
| 6,202,401 B1 * | 3/2001 | Seume | F23N 5/16 431/114 |
| 6,227,842 B1 * | 5/2001 | Lemelson | F23N 5/082 431/12 |
| 6,674,080 B2 | 1/2004 | Trempala et al. | |
| 6,806,471 B2 | 10/2004 | Matsukuma et al. | |
| 6,849,849 B1 | 2/2005 | Warner et al. | |
| 6,937,743 B2 | 8/2005 | Rizzotti et al. | |
| 6,956,486 B2 | 10/2005 | King, Jr. | |
| 6,958,689 B2 | 10/2005 | Anderson et al. | |
| 7,002,478 B2 | 2/2006 | Moore et al. | |
| 7,098,796 B2 | 8/2006 | Chen et al. | |
| 7,154,400 B2 | 12/2006 | Owrutsky et al. | |
| 7,155,029 B2 | 12/2006 | King et al. | |
| 7,202,794 B2 | 4/2007 | Huseynov et al. | |
| 7,221,260 B2 | 5/2007 | Berezowski et al. | |
| 7,244,946 B2 | 7/2007 | Burnette et al. | |
| 7,286,704 B2 | 10/2007 | Pfefferseder et al. | |
| 7,318,335 B2 | 1/2008 | Olesen et al. | |
| 7,321,119 B2 | 1/2008 | King | |
| 7,333,129 B2 | 2/2008 | Miller et al. | |
| 7,385,681 B2 | 6/2008 | Ninomiya et al. | |
| 7,411,193 B2 | 8/2008 | Warner et al. | |
| 7,456,749 B2 | 11/2008 | Anderson | |
| 7,486,399 B1 | 2/2009 | Reichardt et al. | |
| 7,505,126 B2 | 3/2009 | Ninomiya et al. | |
| 2002/0124633 A1 * | 9/2002 | Yang et al. | 73/40.5 R |
| 2003/0234725 A1 * | 12/2003 | Lemelson et al. | 340/521 |
| 2004/0114778 A1 * | 6/2004 | Gobeli et al. | 381/356 |
| 2005/0271247 A1 | 12/2005 | Privalov | |
| 2008/0060260 A1 | 3/2008 | Weder | |
| 2010/0020646 A1 * | 1/2010 | Massa | 367/162 |

OTHER PUBLICATIONS

Office Action for U.S. Appl. No. 12/840,607, Jun. 11, 2013 with 35 pages.

Final Office Action for U.S. Appl. No. 12/840,607, Dec. 19, 2013 with 34 pages.

Notice of Allowance for U.S. Appl. No. 12/840,607, Sep. 17, 2014 with 13 pages.

* cited by examiner

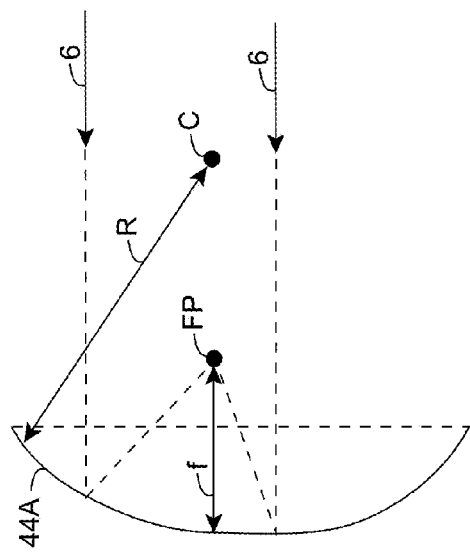
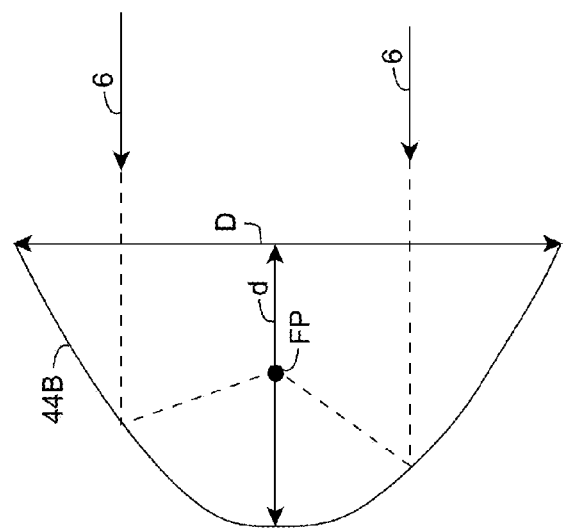
FIG. 8A
FIG. 8B

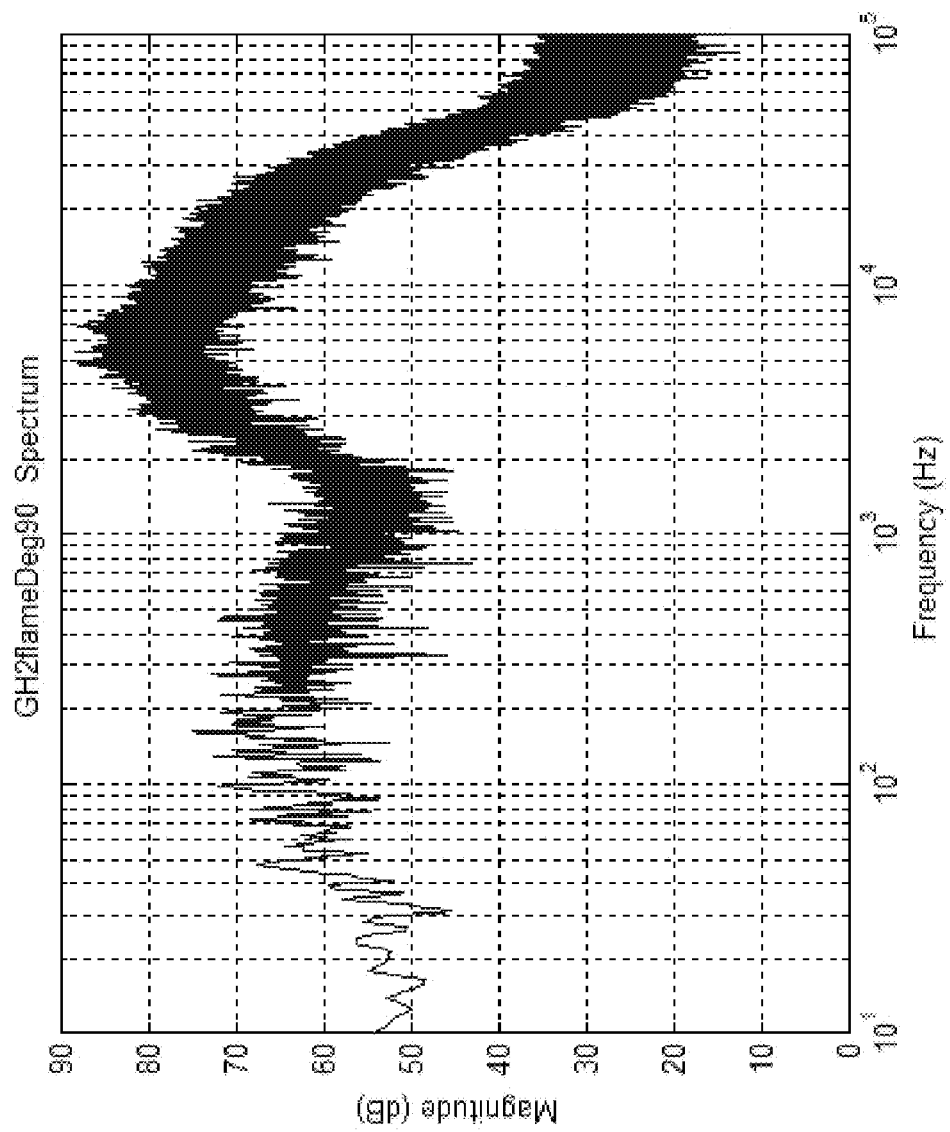

AREA MONITORING FOR DETECTION OF LEAKS AND/OR FLAMES

REFERENCE TO PRIOR APPLICATIONS

The current application is a continuation of U.S. patent application Ser. No. 12/840,607, filed on 21 Jul. 2010, and issued as U.S. Pat. No. 8,941,734, and which claims the benefit of U.S. Provisional Application No. 61/213,877, titled "Method and device for detection of leaks and or flames in a monitored area," which was filed on 23 Jul. 2009, each of which is hereby incorporated by reference.

GOVERNMENT LICENSE RIGHTS

The U.S. Government has a paid-up license in this invention and the right in limited circumstances to require the patent owner to license others on reasonable terms as provided for by the terms of Contract No. NNX09CB42C awarded by National Aeronautics and Space Administration (NASA).

TECHNICAL FIELD

The disclosure relates generally to monitoring areas, and more particularly, to monitoring areas that can include fluids, particularly flammable, pressurized fluids.

BACKGROUND ART

Hydrogen gas is colorless and odorless. Hydrogen burns in air with an invisible flame in an outdoor setting under normal daylight conditions. Due to the small size of the hydrogen molecule, it is extremely difficult to render mechanical joints leak free without welding. Some joints, such as those found at facilities where hydrogen is loaded and stored, must have removable joints for connection, e.g., to delivery vehicles. Similarly, at end-use sites, such as a launch vehicle, removable connections must exist to enable filling of onboard tanks. Hydrogen gas is commonly detected using fixed gas detectors. Outdoors, hydrogen is rapidly dispersed by moving air due to its low molecular weight and density. Further, hydrogen has a low ignition energy and a low threshold concentration, making hydrogen fires a significant hazard in such areas. The problem is further compounded for operations, such as launch complexes, where large quantities of hydrogen and oxidizer in close proximity dictates safety regulations that preclude the use of typical handheld leak or flame detectors by operators to confirm leaks or flames sensed by fixed instruments. Use of fixed leak detection instruments can be problematic due to the ease with which hydrogen disperses outdoors due to air currents. Depending on the location of the leak and the detector(s), the leak may need to be large in order to register on the detector.

For many applications, non-imaging flame detectors do not provide desirable features, such as flame size identification and localization, within a monitored area. Various approaches seek to detect flames and/or leaks using single spectrum, multi-spectrum, non-imaging and imaging devices. Such devices can utilize ultraviolet (UV), near infrared (NIR), or infrared (IR) detection approaches to image electromagnetic emission characteristics of flames in general or flames resulting from the burning of specific materials, such as carbon compounds in air. To date, while many current devices can effectively identify a flame in a monitored area, these devices are susceptible to false indications of flames, e.g., due to reflections of flames, sunlight (direct or reflected), and reflections from vegetation. As a result, operations personnel can be required to review imagery to formulate a correct response to the device identifying a fire in a monitored area. Additionally, such devices are not suitable for use in mission critical applications, such as rocket launch operations, due to the cost associated with mission aborts resulting from false alarms.

In an illustrative prior art flame detection approach, a multispectral method of flame detection employs three infrared detectors and associated filters to select portions of the infrared spectrum. A user uses the device of this approach in the manner of a binocular to view imagery based on spectral content in the near infrared (NIR) region of the spectrum below 800 nanometers (nm) or 1100 nm. The filters render invisible flames visible due to water emissions in the 850-1250 nm portion of the electromagnetic spectrum. The device can trigger an alarm for the user when a flame is detected.

In another illustrative prior art flame detection approach, an imaging flame detection system employs a camera with an 1140 nm band pass filter to select emissions from flames. The system performs size and flicker analysis on blobs extracted from the imagery using a stored reference of flame and false alarm signatures to discriminate between a flame or a false alarm.

In still another illustrative prior art flame detection approach, a non-imaging approach to flame detection utilizes two infrared sensors and one ultraviolet sensor. Cross correlation between the infrared and ultraviolet signals is performed to discriminate between a flame and a reflection of a flame.

The sound made by a pressurized gas or liquid escaping from an orifice is determined by the source pressure and the size of the orifice, which serve to generate turbulence in the air in the immediate vicinity of the leak or flame. Additionally, the resulting turbulence is also dependent on the particular material of the leak or flame. The turbulence, which results in rapid pressure fluctuations in the air near the leak or flame source can be detected with appropriate acoustic pressure transducers. Pressure fluctuations due to a leak or flame typically have a broad spectral content with maximum intensity in the ultrasonic portion of the spectrum (e.g., 20-50 kHz). Ultrasonic energy experiences significant atmospheric attenuation as it emanates from a source, e.g., typically approximately twenty-five decibels per one hundred feet at twenty kilohertz. The attenuation increases with the second power of distance due to circular spreading and with the second power of frequency due to atmospheric absorption.

Devices to detect ultrasonic waves have been proposed for leak detection at distances up to twenty-five feet in a normal outdoor acoustic environment. In an illustrative prior art leak detection approach, an omni-directional microphone detects ultrasonic signals, which are processed using amplitude and temporal duration thresholds to identify leaks from background noise.

Reflecting concave surfaces, such as spherical or paraboloid sections, can focus energy incident on the surface to a single point, referred to as the focal point. Such surfaces are often used as radar and satellite dish antennas to focus electromagnetic waves and for surveillance and tracking certain animals using acoustic waves. Some approaches to leak detection have proposed the use of parabolic antennas to assist in localization of the leak source.

SUMMARY OF THE INVENTION

Aspects of the invention provide a solution for monitoring an area for the presence of a flame and/or a leak, such as from a pressurized fluid. An imaging device can be used that acquires image data based on electromagnetic radiation having wavelengths only corresponding to at least one region of the electromagnetic spectrum in which electromagnetic radiation from an ambient light source is less than the electromagnetic radiation emitted by at least one type of flame for which the presence within the area is being monitored. An acoustic device can be used that is configured to acquire acoustic data for the area and enhance acoustic signals in a range of frequencies corresponding to a leak of a pressurized fluid present in the area.

A first aspect of the invention provides a system comprising: at least one sensing component, the at least one sensing component including: an imaging device, wherein the imaging device is configured to acquire image data for an area based on electromagnetic radiation having wavelengths only corresponding to at least one region of the electromagnetic spectrum in which electromagnetic radiation from an ambient light source is less than the electromagnetic radiation emitted by at least one type of flame; and an acoustic device, wherein the acoustic device is configured to acquire acoustic data for the area; a computer system including at least one computing device, wherein the computer system is configured to monitor the area by performing a method comprising: evaluating the image data for a presence of a flame of the at least one type of flame; evaluating the acoustic data for a presence of at least one of: the flame or a leak of a pressurized fluid; and providing monitoring data for use by a user based on the evaluated presence of at least one of: the flame or the leak.

A second aspect of the invention provides a system comprising: at least one sensing component, the at least one sensing component including: an imaging device, wherein the imaging device is configured to acquire image data for an area; and an acoustic device, wherein the acoustic device is configured to acquire acoustic data for the area and enhance acoustic signals in a range of frequencies corresponding to a leak of a pressurized fluid present in the area, the acoustic device including: a reflective surface, wherein the reflective surface is at least one of: a parabolic or a spherical shape having a focal length that is at least as large as an aperture of the reflective surface; and a transducer configured to convert acoustic signals acquired at a focal point of the reflective surface into acoustic data; a computer system including at least one computing device, wherein the computer system is configured to monitor the area by performing a method comprising: evaluating the image data for a presence of a flame of the at least one type of flame; evaluating the acoustic data for a presence of at least one of: the flame or a leak of the pressurized fluid; and providing monitoring data for use by a user based on the evaluated presence of at least one of: the flame or the leak.

A third aspect of the invention provides a system comprising: an imaging device, wherein the imaging device is configured to acquire image data for an area based on electromagnetic radiation having wavelengths only corresponding to at least one region of the electromagnetic spectrum in which electromagnetic radiation from an ambient light source is less than the electromagnetic radiation emitted by at least one type of flame; and a computer system including at least one computing device, wherein the computer system is configured to monitor the area by performing a method comprising: evaluating the image data for a presence of a flame of the at least one type of flame; and providing monitoring data for use by a user based on the evaluated presence of the flame, wherein the monitoring data includes annotated image data of the area.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 8A and 8B show illustrative two-dimensional slices of a spherical surface and a parabolic surface, respectively.

FIGS. 10A-10C show illustrative acoustic frequency spectra according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for monitoring an area for the presence of a flame and/or a leak, such as from a pressurized fluid. An imaging device can be used that acquires image data based on electromagnetic radiation having wavelengths only corresponding to at least one region of the electromagnetic spectrum in which electromagnetic radiation from an ambient light source is less than the electromagnetic radiation emitted by at least one type of flame for which the presence within the area is being monitored. An acoustic device can be used that is configured to acquire acoustic data for the area and enhance acoustic signals in a range of frequencies corresponding to a leak of a pressurized fluid present in the area. As used herein, unless otherwise noted, the term "set"

means one or more (i.e., at least one) and the phrase "any solution" means any now known or later developed solution.

Embodiments of the invention can address one or more problems of previous approaches to flame and/or leak detection. For example, an embodiment provides an automated approach to flame and/or leak detection, which can be integrated with other external systems and/or provide flame information, such as flame size, localization, and/or the like for use by another system and/or a user. An embodiment provides a flame detection solution, which can ignore reflections, e.g., of acceptable flames (e.g., at a flare stack, welding site, and/or the like), sunlight, and/or the like. Another embodiment provides a flame detection solution, which can detect various types of flames, including flames produced by high pressure fluid (e.g., gas or liquid) emanating from a small orifice, hydrogen flames, which can exhibit substantially no periodic variability, and/or the like. Furthermore, an embodiment provides a leak detection solution, which can discriminate loud continuous ultrasound background from a leak, as well as detect relatively small leaks for various applications.

Additional aspects of the invention are shown and described herein with reference to the automated detection of a hydrogen leak and/or flame within a monitored area. However, it is understood that aspects of the invention apply to other types of burning and/or leaking fluids, particularly where such a leak and/or flame is the result of material passing through an orifice or other opening under some pressure higher than the atmospheric pressure. Embodiments of the invention can enable positioning of sensing devices for detecting a leak and/or flame at a further distance from a potential leak/flame source than prior art approaches. The distance can enable monitoring to be performed in a safer manner and/or with fewer sensing devices.

Figure 1:
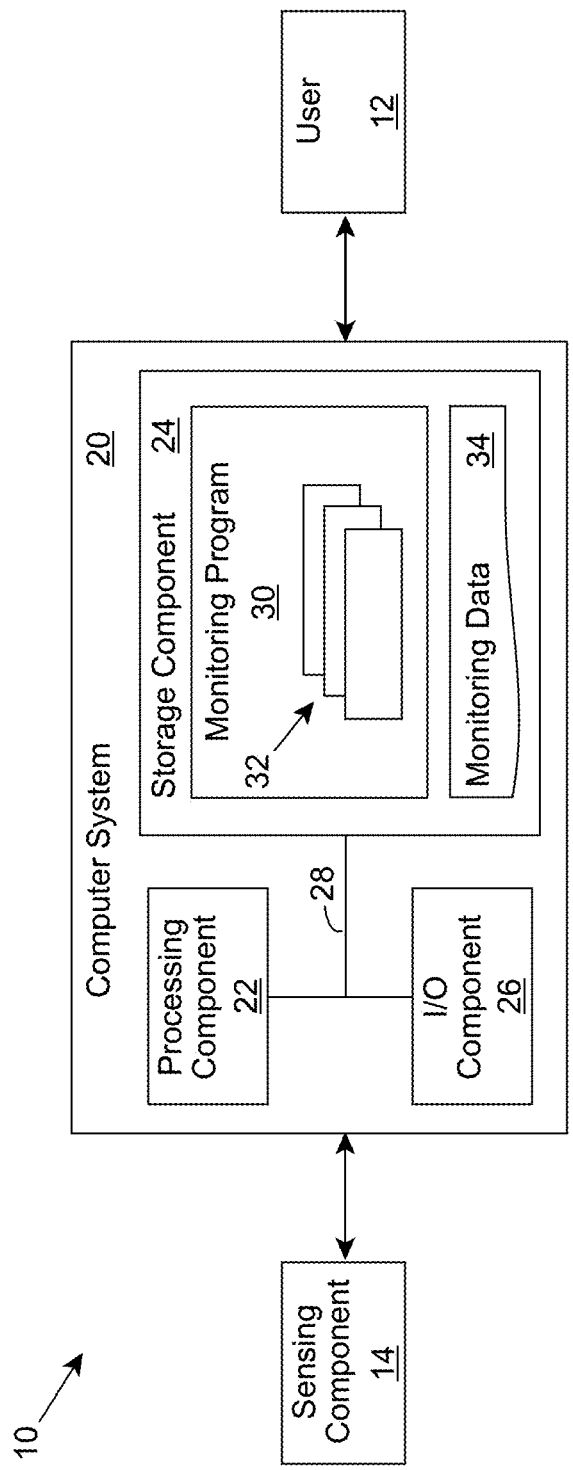
FIG. 1 shows an illustrative environment for monitoring an area according to an embodiment.

Turning to the drawings, FIG. 1 shows an illustrative environment 10 for monitoring an area according to an embodiment. To this extent, environment 10 includes a computer system 20 that can perform a process described herein in order to monitor an area to automatically detect leaks and/or flames. For example, computer system 20 is shown including a monitoring program 30, which makes computer system 20 operable to monitor the area by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as monitoring program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable one or more external devices, such as a sensing component 14 and/or a system user 12, to communicate with computer system 20 using any type of communications link. To this extent, computer system 20 can manage a set of interfaces (e.g., graphical user interface(s), application program interface, and/or the like) that enable human and/or system users 12, sensing component 14, and/or the like, to interact with computer system 20. Furthermore, monitoring program 30 can manage (e.g., store, retrieve, create, manipulate, organize, present, etc.) the data, such as monitoring data 34, using any solution.

In any event, computer system 20 can comprise one or more of any combination of various types of computing devices. For example, computer system 20 can comprise one or more general purpose computing articles of manufacture (e.g., computing devices) capable of executing program code, such as monitoring program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, monitoring program 30 can be embodied as any combination of system software and/or application software.

Furthermore, monitoring program 30 can be implemented using a set of modules 32. In this case, a module 32 can enable computer system 20 to perform a set of tasks used by monitoring program 30, and can be separately developed and/or implemented apart from other portions of monitoring program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of computer system 20.

When computer system 20 includes multiple computing devices, the computing devices can communicate over any type of communications link. Further, while performing a process described herein, computer system 20 can communicate with one or more other computer systems and devices, such as user 12 and/or sensing component 14, using any type of communications link. In either case, the communications link can comprise any combination of various types of wired and/or wireless links; comprise any combination of one or more types of networks; and/or utilize any combination of various types of transmission techniques and protocols.

Additionally, each computing device can implement only a portion of the actions described herein with respect to computer system 20. To this extent, each computing device can have only a portion of monitoring program 30 fixed thereon (e.g., one or more modules 32). However, it is understood that computer system 20 and monitoring program 30 are only representative of various possible equivalent computer systems that may perform a process described herein. To this extent, in other embodiments, the actions implemented by computer system 20 can be at least partially implemented by one or more computing devices that include any combination of general and/or specific purpose hardware with or without program code. In each embodiment, the hardware and program code, if included, can be created using standard engineering and programming techniques, respectively.

Figure 2:
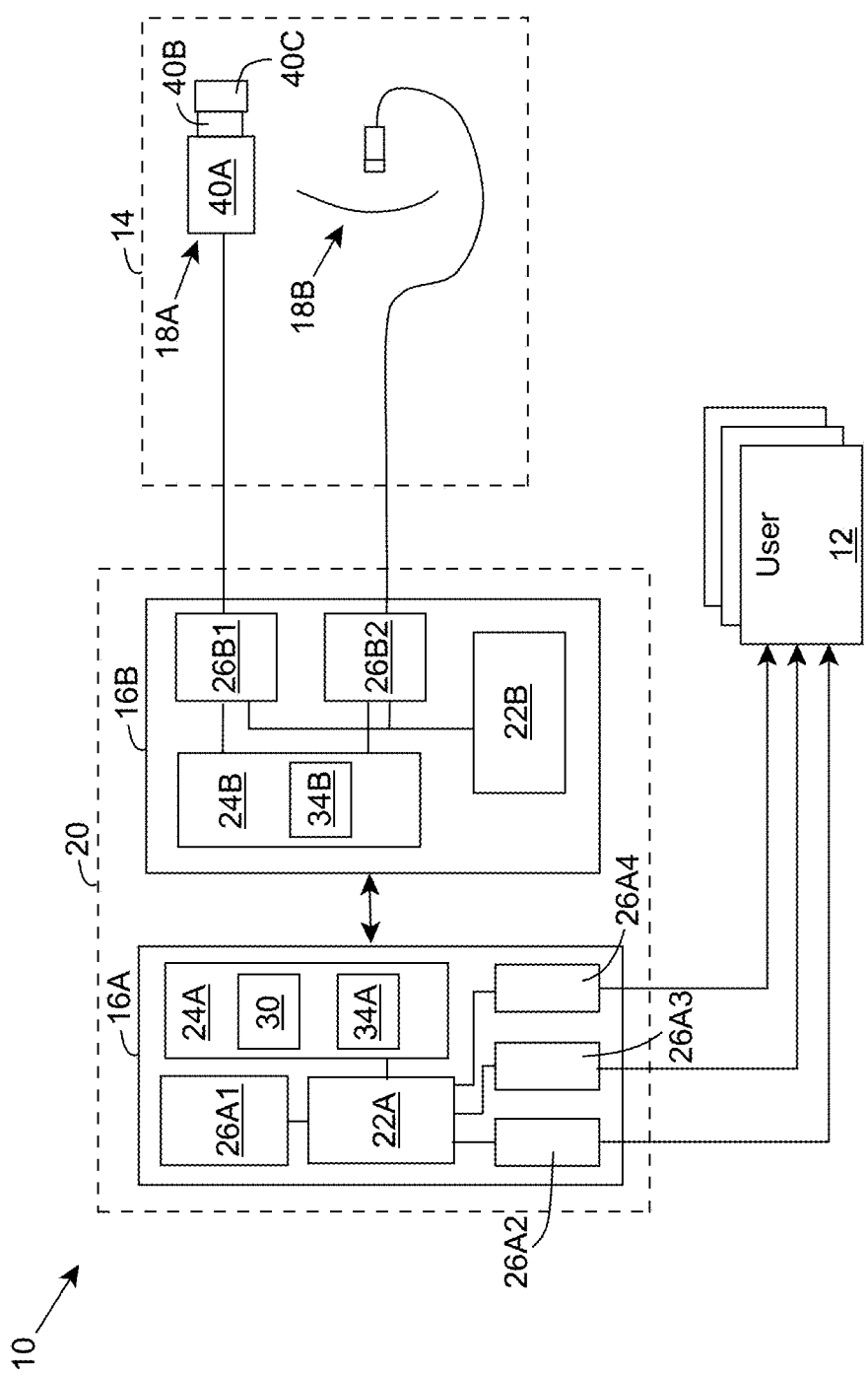
FIG. 2 shows an illustrative implementation of the environment of FIG. 1 according to an embodiment.

FIG. 2 shows an illustrative implementation of environment 10 according to an embodiment. In this case, computer system 20 is implemented using a pair of computing devices 16A, 16B, and sensing component 14 includes two sensing devices 18A, 18B. It is understood that sensing component 14 and computer system 20 can include any number of devices. Additionally, it is understood that environment 10 can include any number of computer systems 20 and sensing components 14. In general, the sensing devices 18A, 18B capture raw monitoring data 34 (FIG. 1) for an area being monitored, which is provided to computer system 20 for further processing. In an embodiment, computing device 16B comprises a signal processing computing device 16B, which performs various preliminary processing actions on the raw monitoring data 34 received from sensing component 14 to generate intermediary monitoring data 34B, while computing device 16A comprises a main processing computing device 16A, which performs higher level processing and analysis of the raw and/or intermediary monitoring data 34B to generate high level monitoring data 34A. Computing device 16A can provide some or all of the monitoring data 34 for use by one or more users 12. For example, computing device 16A can provide raw and/or annotated video data, raw and/or edited audio data, alarm data, notification data, action data, and/or the like, for use by one or more users 12.

In FIG. 2, sensing device 18A comprises an imaging device, such as a near infrared imaging device, and sensing device 18B comprises an acoustic sensor, such as an ultrasonic sensing device. Each sensing device 18A, 18B is shown operatively coupled to the signal processing computing device 16B. Computing device 16B can comprise a processing component 22B to control operation of the computing device 16B and/or the various sensing devices 18A, 18B. For example, processing component 22B can comprise a digital signal processor, an embedded processor, fixed logic (such as a field programmable gate array (FPGA)), and/or the like. In any event, image data, such as near infrared image data, can be provided from sensing device 18A to an I/O interface 26B1 of computing device 16B, such as a frame grabber, which can convert the image data (e.g., video) into digital data and store the digital data as monitoring data 34B in a memory 24B of computing device 16B. Similarly, acoustic data, such as analog ultrasonic data, can be provided from sensing device 18B to another I/O interface 26B2 of computing device 16B, such as an analog to digital converter, which can convert the acoustic data into digital data and store the digital data as monitoring data 34B in the memory 24B.

The main processing computing device 16A can access the monitoring data 34B stored in the memory 24B of computing device 16B using any type of connection. To this extent, computing device 16A can include a processing component 22A (e.g., a general purpose processor executing monitoring program cede 30), which performs operations on monitoring data 34A stored in memory 24A and/or monitoring data 34B stored in memory 24B. Processing component 22A can further control various I/O interfaces 26A1-4. For example, I/O interface 26A1 can enable one or more human interface devices (e.g., display, keyboard, mouse, and/or the like), to interact with computing device 16A.

Furthermore, I/O interfaces 26A2-4 can provide various types of monitoring data 34A, 34B as output data, such as alarm indications when a leak or flame is detected by computing device 16A, for use by one or more users 12. For example, I/O interface 26A2 can comprise a discrete output device for providing a set of alarm (or non-alarm) outputs, e.g., to a warning light, a buzzer, a horn, and/or the like. I/O interface 26A3 can comprise an acoustic output device, e.g., which generates a heterodyned version of the acoustic input data that is within the range of human hearing. A human user 12 can use the output provided by I/O interface 26A3 to, for example, listen to a frequency shifted version of the acoustic input signal captured by sensing device 18B. I/O interface 26A4 can comprise circuitry configured to generate a video output, which can comprise an annotated version of the image data acquired by sensing device 18A. An illustrative annotation comprises pseudo-coloring of areas with flames. Other coloring can be added to highlight area(s) in the image data containing motion that may be a possible flame but could not be classified as such by the flame detection algorithms. Still other annotations can include labeling (e.g., by symbol, text, and/or the like) various areas of interest, and other methods of annotating as may be appropriate to the presentation of the image.

As discussed herein, sensing component 14 can comprise one or more sensing devices 18A for acquiring image data of an area being monitored by environment 10. In an embodiment, the image data is processed by computer system 20 to automatically monitor the area for a presence of an undesirable flame, such as a hydrogen flame. In general, a flammable material burning in air produces an emission spectrum resulting from the excitation of chemical bonds in the combustion products. For hydrogen burning in air, the primary product is water. During the burning of hydrogen, molecular fragments, such as the OH$^-$ radical, also may be present.

In an embodiment, sensing component 14 includes one or more sensing devices 18A for acquiring image data corresponding to one or more portions of the electromagnetic spectrum, which correspond to wavelengths of radiation that are emitted by the undesirable flame. The sensing device(s) 18A can comprise an imaging device that includes a camera, optics, filters and/or the like, which preferentially pass radiation having the wavelengths of interest and/or block radiation having undesired wavelengths (e.g., unrelated to the flame of interest). The sensitivity of the sensing device 18A can be adjusted to recognize the flame of one material while having reduced sensitivity to other flames by proper selection of filters in the camera to be preferentially sensitive to the emission spectrum of a desired burning material.

Figure 3:
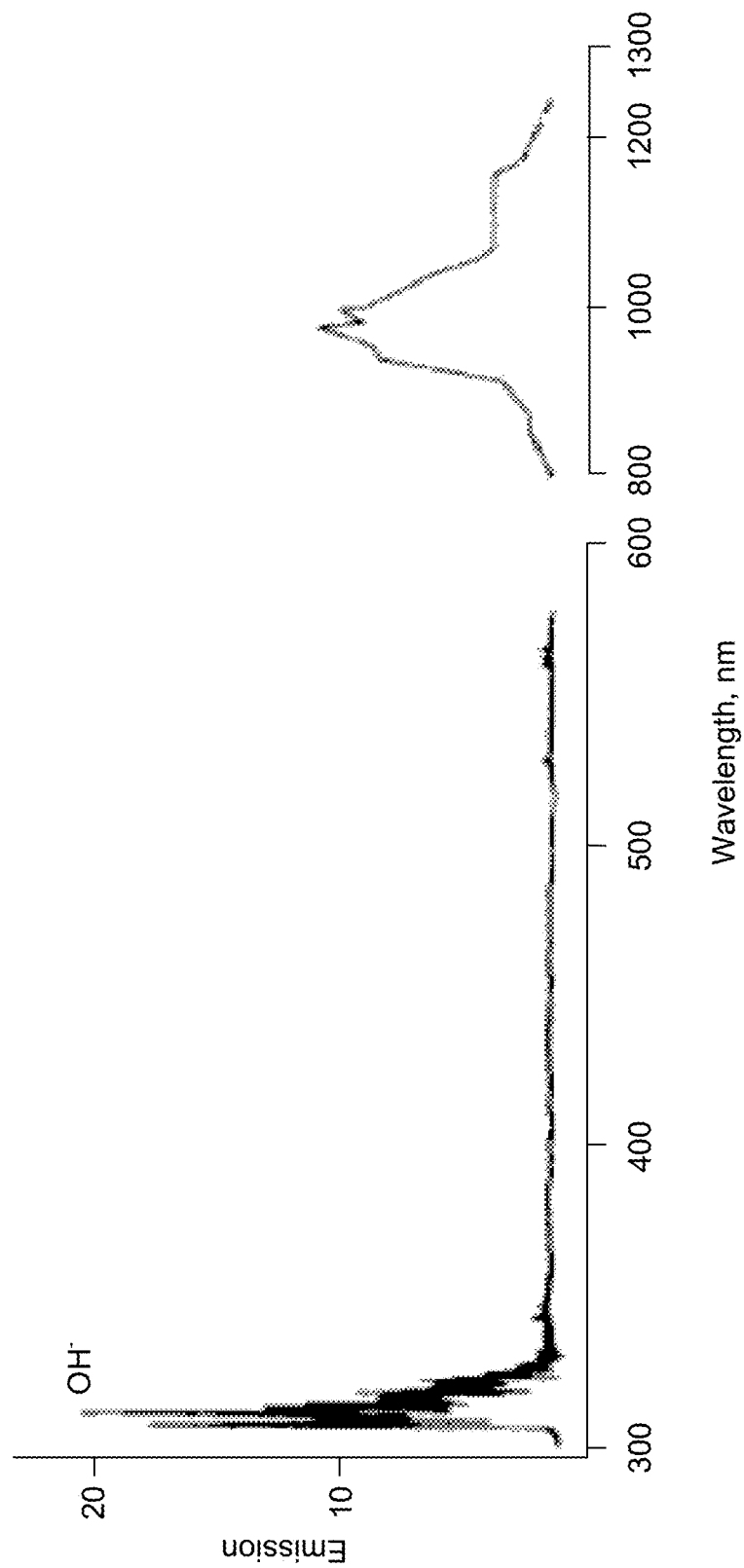
FIG. 3 shows emission lines observed when hydrogen burns in air for illustrative portions of the electromagnetic spectrum.

FIG. 3 shows emission lines observed when hydrogen burns in air for illustrative portions of the electromagnetic spectrum. The leftmost portion of the graph shows the ultraviolet through visible portion of the spectrum from 300 nanometers (nm) to 575 nm. Emission peaks are seen in the range from 300-325 nm, which are due to the OH$^-$ radical. The right portion of the graph depicts emissions in the near infrared portion of the electromagnetic spectrum from 800-1250 nm. In this band, various stretching, bending, and rotational modes of a water molecule result in nearly continuous emissions from 800 nm to 1250 nm. While not shown FIG. 3, burning hydrogen also comprises emission lines centered around 1380 and 1900 nm. To monitor an area for the presence of an unwanted hydrogen flame, sensing component 14 can include sensing device(s) 18A that acquire image data primarily corresponding to wavelengths of radiation in one or more of: 300-325 nm, 800-1250 nm, 1300-1400 nm, and/or 1800-1950 nm.

Additional sources of electromagnetic radiation (e.g., ambient light sources) can make successful evaluation of image data for the presence of a flame more difficult for portions of the electromagnetic spectrum in which the flame and the other source(s) both emit electromagnetic radiation of the corresponding wavelengths. In particular, if the radiation of another source of electromagnetic radiation in a monitored area at a relevant wavelength is sufficiently bright, specular and diffuse reflections of objects in the monitored area may be stronger than the radiation from a flame in the same area. For example, in outdoor applications, the radiation of the sun can reduce the effectiveness of evaluating image data for the presence of a hydrogen flame for certain portions of the electromagnetic spectrum.

In an embodiment, sensing device(s) 18A acquire image data primarily corresponding to wavelengths of radiation in which radiation from each ambient light source is sufficiently low and/or substantially non-existent. In an embodiment, a range of wavelengths is selected in which the spectral irradiance of the ambient light source(s) is less than the emission of a flame for the same range of wavelengths. For example, the range of wavelengths can be selected such that a flame will emit at least twice the amount of spectral irradiance that may be present due to an ambient light source.

Figure 4:
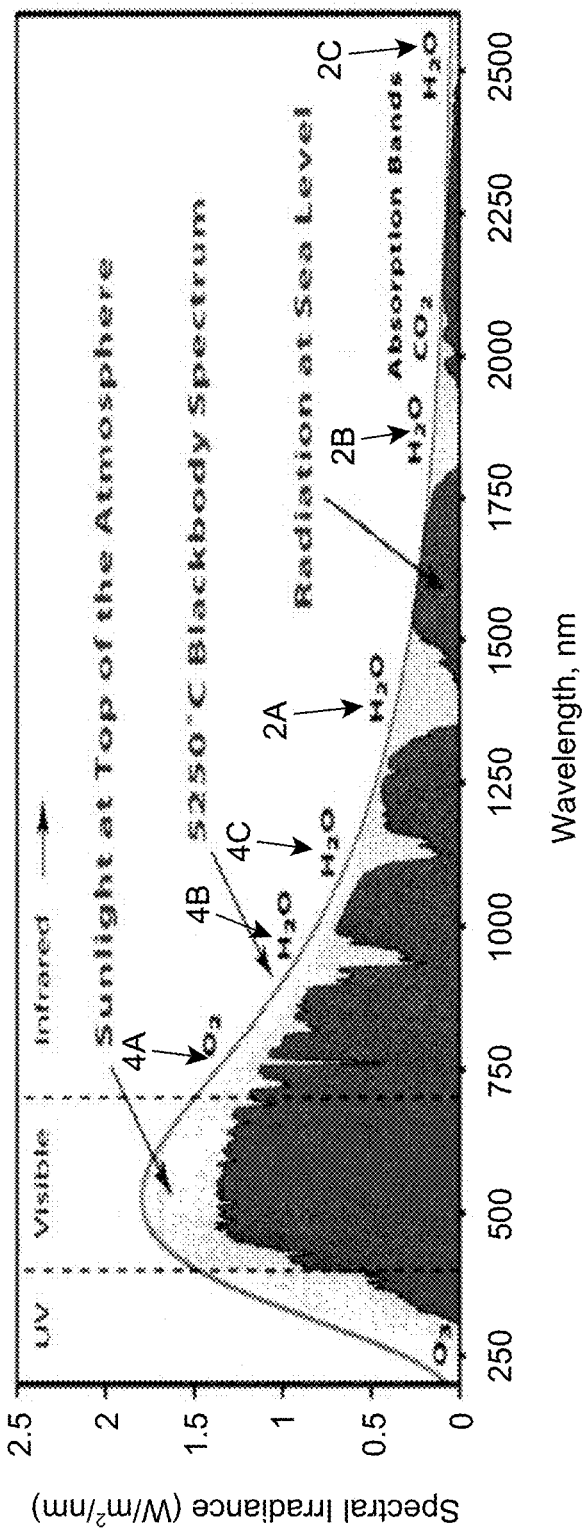
FIG. 4 shows typical solar radiation at the surface of the earth for an illustrative portion of the electromagnetic spectrum.

For an outdoor application, an ambient light source can comprise the sun. FIG. 4 shows typical solar radiation at the surface of the earth for an illustrative portion of the electromagnetic spectrum. At the top of the earth's atmosphere, solar radiation is well approximated by black body radiation at a temperature of 5250° K. Due to absorption that occurs due to molecules present in the atmosphere, certain regions of the spectrum can have significantly reduced solar radiation when the solar radiation reaches the earth's surface. For example, little or no solar radiation is present at the earth's surface in several regions of the electromagnetic spectrum primarily due to the presence of ozone ($O_3$), oxygen molecules ($O_2$), water vapor ($H_2O$), and carbon dioxide ($CO_2$) in the atmosphere. While sunlight is shown and described herein as illustrative ambient light, it is understood that the spectral irradiance for other light sources, such as artificial light sources, can be similarly analyzed.

In an embodiment, sensing component 14 includes one or more sensing devices 18A for acquiring image data for a monitored area corresponding to only one or more of the regions in which little or no radiation is present from an ambient light source, e.g., to evaluate the monitored area for the presence of a flame. For example, a flame that produces water as a byproduct, such as hydrogen burning in air or oxygen, produces emission lines in the same spectral regions in which solar radiation is removed by water vapor in the atmosphere. In an application that monitors an outdoor area for the presence of such a flame, sensing device(s) 18A can acquire image data corresponding to only one or more of these regions of the electromagnetic spectrum. To this extent, sensing device(s) 18A can acquire image data corresponding to one or more of regions 2A, 2B, and 2C of the electromagnetic spectrum, in which the solar radiation is typically completely removed at the earth's surface (e.g., sea level).

However, for some applications, current sensing device(s) 18A that acquire image data corresponding to one or more of regions 2A, 2B, and 2C are too expensive and/or provide insufficient resolution to image flames at a desired distance. Currently, cameras constructed using charge coupled device (CCD) technology are relatively low cost and possess higher sensitivity and resolution in regions 4A, 4B, and 4C to enable image acquisition and evaluation at larger distances. To this extent, in an embodiment, sensing component 14 includes sensing device(s) 18A configured to acquire image data corresponding to one or more of regions 4A, 4B, and 4C of the electromagnetic spectrum.

Reflections from vegetation and/or clouds can be particularly strong in regions 4A and 4B of the electromagnetic spectrum. To this extent, for applications in which such reflections may be present in the monitored area, the sensing device(s) 18A can be configured to acquire image data corresponding to region 4C. While region 4C is at the limits of the response of current CCD cameras, the reduced sensitivity to radiation reflected from vegetation, clouds, and other outdoor sources can be advantageous in enabling computer system 20 (FIG. 1) to evaluate the image data where such reflections may be present for the presence of an undesired flame.

Returning to FIG. 2, an embodiment of sensing device 18A can be sensitive to the radiation emission of a hydrogen flame (e.g., as shown in FIG. 3) in an outdoor environment where radiation from sunlight (e.g., as shown in FIG. 4) may be present. In a more particular embodiment, sensing device 18A is configured to acquire image data corresponding to region 4C. For example, sensing device 18A can include a camera 40A and a lens 40B that are sensitive to electromagnetic radiation having wavelengths in the range of approximately 1100-1250 nm. To eliminate radiation in other spectral regions to which the camera 40A may be sensitive, sensing device 18A can further include a low pass filter 40C, which is placed in front of the lens 40B. In an embodiment, the cut on wavelength of the filter 40C can comprise approximately 1150 nm. Camera 40A can effectively provide a cut off wavelength of approximately 1250 nm, e.g., due to current limits of the CCD technology. In this case, sensing device 18A can act as a band pass filter for 1150-1250 nm radiation, which has a high transmission efficiency of a low pass filter. It is understood that the range of 1150-1250 nm is only illustrative, and other ranges of wavelengths corresponding to region 4C can be implemented.

Figure 5:
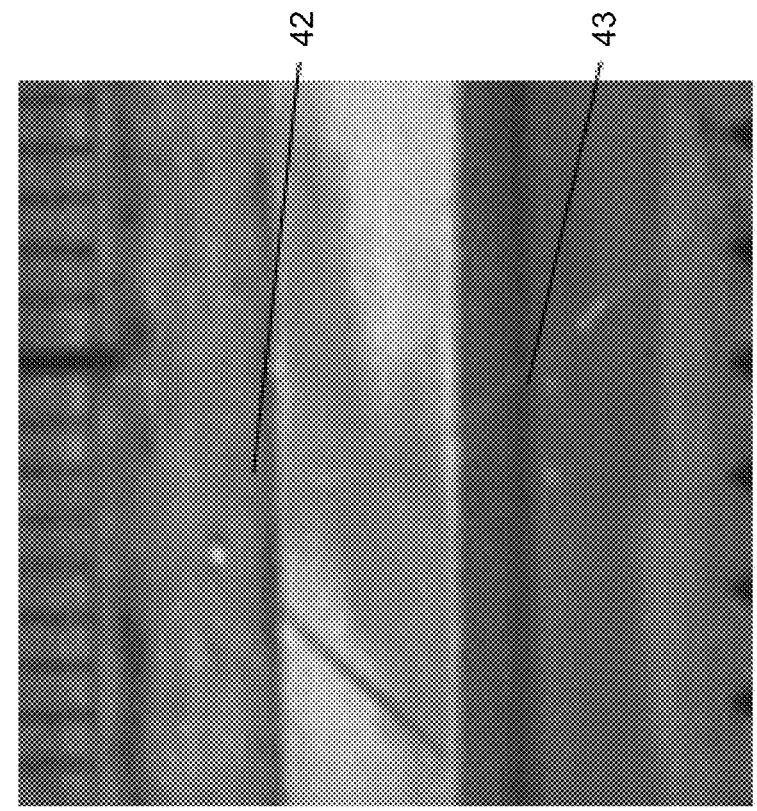
FIG. 5 shows an illustrative image of an outdoor hydrogen flame.
Figure 6:
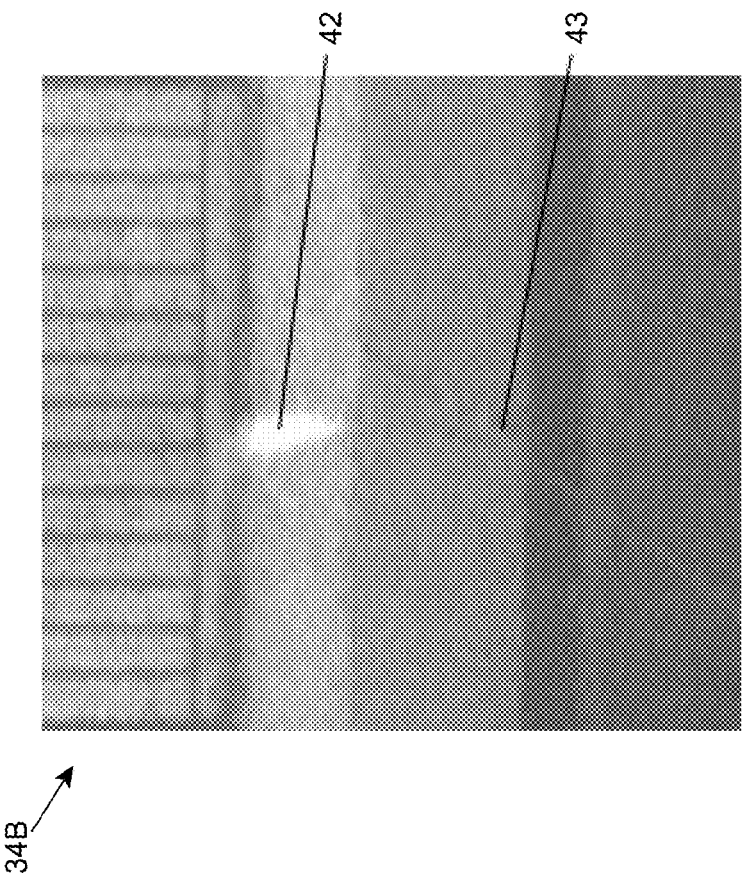
FIG. 6 shows an illustrative image of the outdoor hydrogen flame acquired by a sensing device according to an embodiment.

FIGS. 5 and 6 show illustrative images 34A, 34B, respectively, of an outdoor hydrogen flame. In each image 34A, 34B, a hydrogen flame is present at location 42, which is emitted from a hydrogen feed tube 43. Image 34A was captured by a camera 40A and lens 40B without the presence of a low pass filter 40C, while image 34B was captured by the sensing device 18A (FIG. 2) described above, including the low pass filter 40C with a cut on wavelength of approximately 1150 nm. As illustrated by image 34A, the significant visible radiation present below 1150 nm, made the relatively weak near infrared radiation of the flame undetectable in image 34A. In contrast, by removing radiation having wavelengths below approximately 1150 nm, the infrared radiation emitted by the flame can be readily detected in image 34B.

Figure 7:
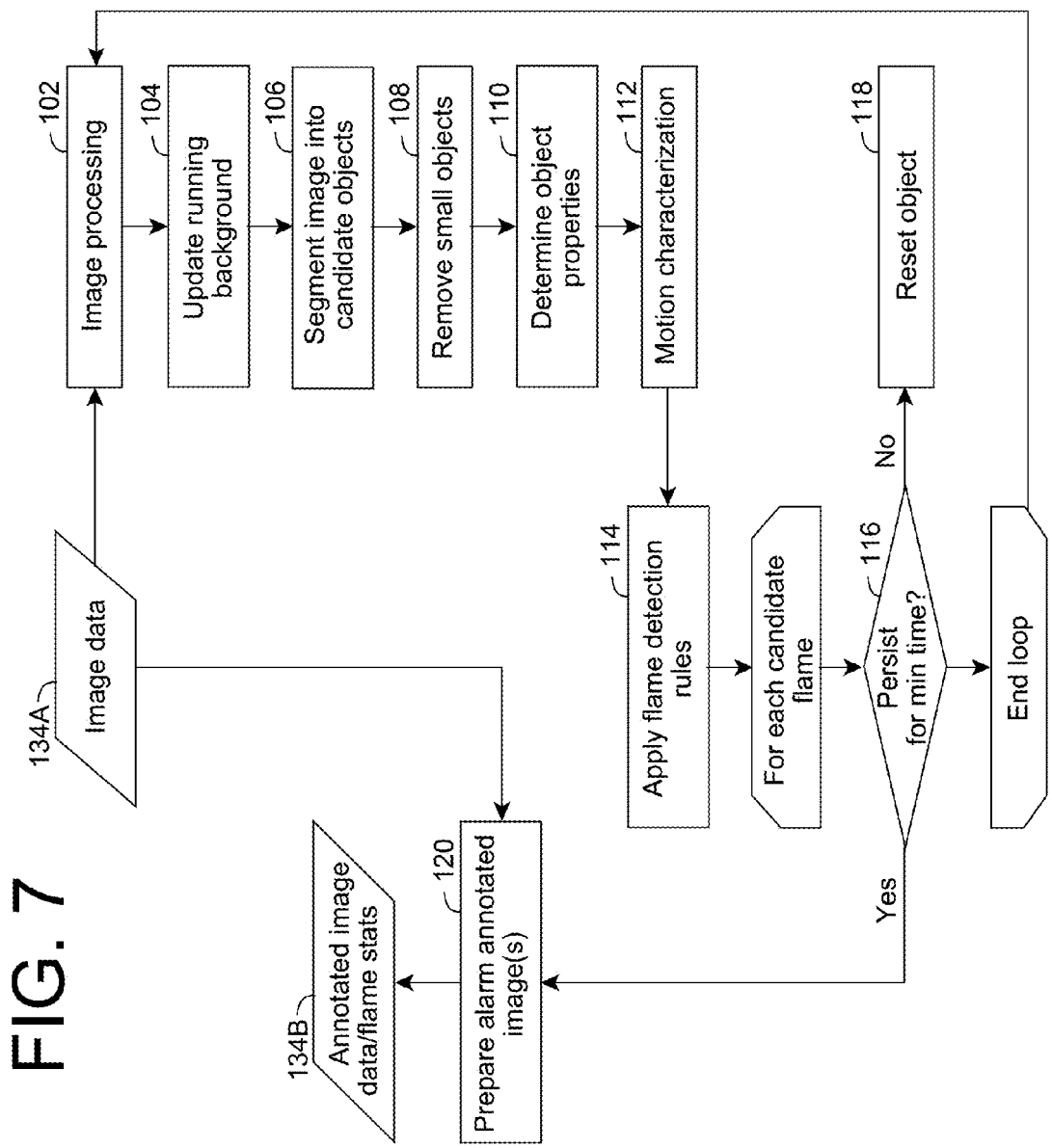
FIG. 7 shows an illustrative process for automatically identifying a flame present in a monitored area using image data according to an embodiment.

FIG. 7 shows an illustrative process for automatically identifying a flame present in a monitored area using image data according to an embodiment, which can be implemented by environment 10 (FIGS. 1 and 2). Referring to FIGS. 2 and 7, in action 102, computer system 20 receives image data 134A (e.g., as part of a video) acquired by sensing device 18A and performs image processing on the image data 134A. In an embodiment, computer system 20 can receive and process image data at approximately thirty frames per second. However, it is understood that various imaging rates can be utilized. Regardless, computing device 16B can perform processing on each image in the video to enhance contrast, eliminate impulsive pixelated noise that might be erroneously categorized as motion, and/or the like, using standard processing approaches, such as histogram stretching and equalization combined with low pass and median filtering, and store the processed image data as monitoring data 34B.

In action 104, computer system 20 can update a running background corresponding to the region being monitored based on the processed image data. For example, computing device 16B can obtain an initial background image, e.g., which is known not to include any moving objects or undesired flames, and store it as a running background as part of monitoring data 34B. Subsequently, computing device 16B can compare and update attributes of various pixels in a previously stored running background with the attributes found in the processed image data. For example, relatively small changes to one or more attributes can be propagated in the image data for the running background. In this case, the running background can be updated to reflect the current background, which may undergo gradual changes over time, e.g., due to the motion of the sun, clouds, fluctuations of leaves, and/or the like, thereby reducing any adverse effects that such gradual changes can have on evaluating the image data.

The running background can be used to isolate moving object(s) in the field of view from the background. To this extent, in action 106, computer system 20 can segment the image data into zero or more candidate objects. For example, computing device 16A can identify regions of difference from the running background. In an embodiment, computing device 16A can use an adaptive thresholding technique to identify the candidate object(s), if any. In an embodiment, one or more regions within the image data that are known to contain acceptable flame(s), such as a flare stack, are excluded from the segmenting performed by computer system 20. In action 108, computing device 16A can remove any candidate objects that are less than a minimum flame size detection limit, e.g., using standard morphological methods.

In action 110, computing device 16A can determine one or more object properties for each candidate object. The object properties can include, for example, a bounding box, a centroid, a major axis length, an orientation, a periphery, a solidarity, and/or the like, each of which can be determined using standard image processing methods. Computing device 16A also can calculate one or more additional properties of the gray scale region in the original image data corresponding to each detected candidate object, such as a root mean square (RMS) amplitude, a flicker frequency, and/or the like. In action 112, computing device 16A can characterize one or more aspects of the motion of a candidate object. For example, computing device 16A can calculate a trajectory of the center of mass for each candidate object that is a candidate flame and has been present for more than one sequential frame.

In action 114, computing device 16A can apply a set of flame detection rules to all of the candidate objects. Such rules can include, for example, variance of the center of mass, change in orientation or length of the major axis, flicker frequency and amplitude, irregularity of the edges, rapidity of changes to one or more aspects of the shape (e.g., the periphery), and/or the like. Computing device 16A can identify any candidate object that passes a sufficient number of the flame detection rules (e.g., all of them) as a candidate flame. Additionally, computing device 16A can manage data identifying a duration for which each candidate object has been identified as a candidate flame. For example, computing device 16A can set a counter for each candidate object that is identified as a candidate flame to record a number of consecutive frames that the candidate object has been considered a candidate flame.

In action 116, for each candidate flame, computing device 16A can determine whether the candidate flame has persisted for a minimum amount of time. For example, computing device 16A can determine if the candidate flame has passed a sufficient amount of the flame detection rules for a minimum number of consecutive frames (e.g., thirty frames). If not, computing device 16A also can determine if the candidate flame has failed a certain number of the flame detection rules (e.g., one or more) for a percentage of the time (e.g., five frames out of twenty). If so, in action 118, computing device 16A can reset the candidate flame designation corresponding to the candidate object.

In response to computing device 16A identifying a candidate flame that has persisted for a sufficient amount of time, in action 120, computing device 16A can generate one or more types of monitoring data 1348 indicating the presence of an undesired flame within the monitored area. For example, computing device 16A can prepare alarm annotated image(s) based on the image data 134A, which computing device 16A can provide for processing by/presentation to one or more users 12. The annotated image(s) can include an indication of the size, location, and/or characteristics of the detected flame(s). Similarly, computing device 16A can generate and provide flame statistics, alarm messages, an alarm (e.g., discrete) signal, and/or the like, for use by one or more users 12. The alarm signal can result in a displayed alarm (e.g., red light), an audible alarm (e.g., an alert sound), and/or the like, which can alert a user 12 of the detected flame.

As discussed herein, sensing component 14 can comprise one or more sensing devices 18B for acquiring acoustic data of an area being monitored by environment 10. In an embodiment, computer system 20 processes the acoustic data to automatically detect a leak and/or flame of a pressurized fluid. In a more particular embodiment, one or more acoustic sensing devices 18B are configured to be located fifty feet or more from a potential leak source, while being capable of detecting very small leaks, e.g., less than 0.5 grams/second (g/sec) of a light gas, such as hydrogen. For example, an acoustic sensing device 18B can comprise a high gain, directional antenna, which is optimized for performance in the 10-50 kilohertz (kHz) frequency range. Such an acoustic sensing device 18B can detect leaks of less than 0.5 g/sec from a distance of approximately 50-75 feet in a normal outdoor acoustic environment.

FIGS. 8A and 8B show illustrative two-dimensional slices of a spherical surface 44A and a parabolic surface 44B, respectively. The spherical surface 44A is defined by a center, C, and a radius of curvature, R. The location of the focus point, FP, can be calculated using the formula f=½*R, where f is the focal length. The parabolic surface 44B is defined by a diameter, D, and a sagittal depth, d. The focal length, f, which corresponds to the location of the focal point, FP, can be calculated as $f=D^2/16\ d$.

For either surface 44A, 44B, when substantially parallel radiation 6 is incident on either shape, substantially all of the energy is concentrated at the respective focal point, FP. To this extent, the signal output of a transducer located at either focal point, FP, is substantially higher for a source of radiation 6 when either surface 44A, 44B is present versus when it is not present. In an ideal case, the increase in signal level is proportional to the square of the aperture of the shape and the frequency of the incident radiation 6. For example, for the parabolic surface 44B, the maximum signal increase or gain, G, can be calculated by $G=\eta(\pi Df/v)^2$, where $\eta$ is an efficiency factor, D is the aperture, f is the frequency of the radiation 6, and v is the propagation velocity of the radiation 6. The maximum gain is specified for radiation received from a source on the main axis of the reflective surface 44B. The efficiency factor η is critical in practical applications as it can have a large variation dependent upon the chosen design parameters and the nature of the radiation to be measured.

Use of a reflective surface 44A or 44B also increases the directional sensitivity to incident radiation 6, which can be used, for example, to localize a signal source. The directional sensitivity is defined by the beamwidth, which is the solid angle that defines the points at which the gain is reduced to ½ of the on-axis gain. The beam width, B, for a parabolic antenna is given by $B=kv/fD$, where k is a proportionality factor, D is the aperture, f is the frequency of the radiation 6, and v is the propagation velocity of the radiation 6.

Figure 9:
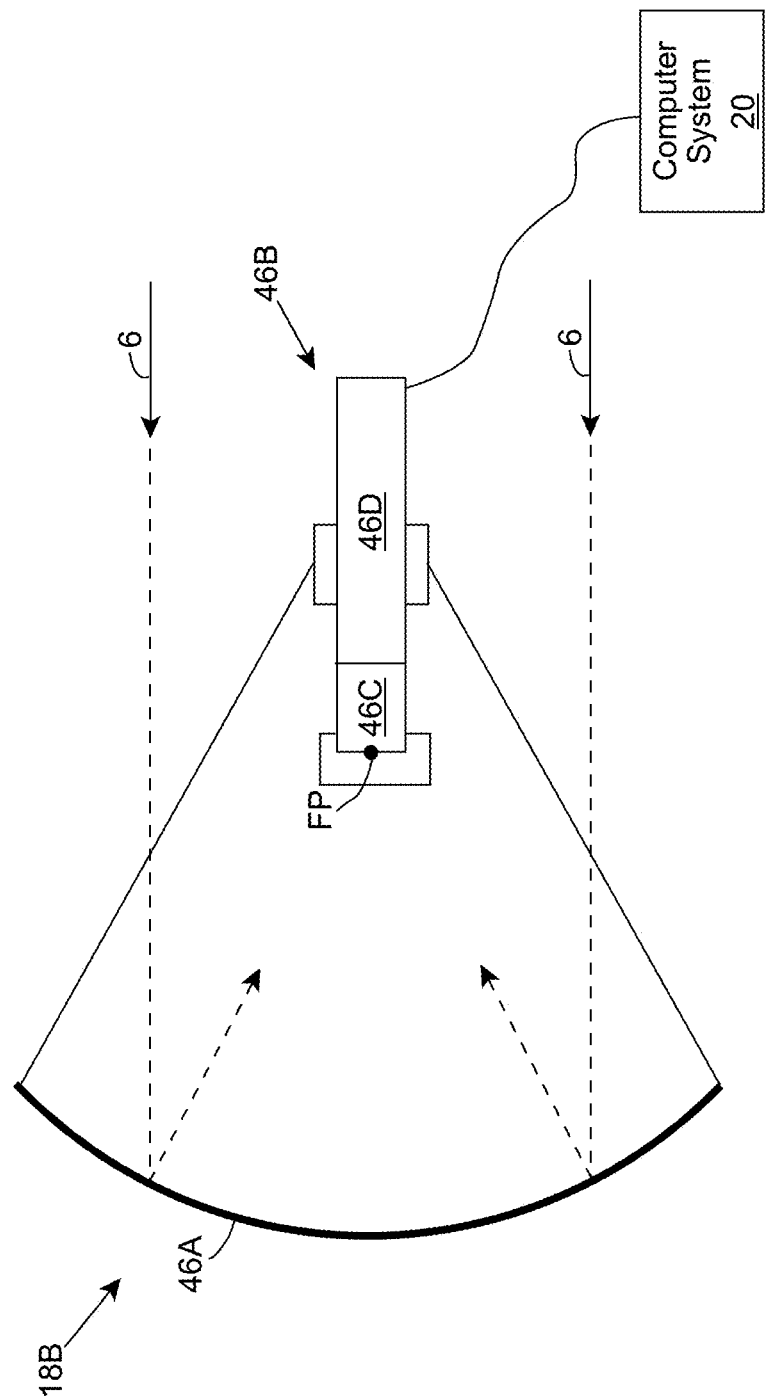
FIG. 9 shows an illustrative acoustic sensing device according to an embodiment.

FIG. 9 shows an illustrative acoustic sensing device 18B according to an embodiment. Contrary to prior art approaches, acoustic sensing device 18B is configured for high gain at a relatively large distance from a potential leak source. Acoustic sensing device 18B includes a reflective surface (antenna) 46A and a transducer 46B. As illustrated, reflective surface 46A reflects acoustic signals received from a narrowly focused directional area toward a focal point, FP, thereby providing mechanical amplification of any on-axis/nearly on-axis acoustic signals arriving at acoustic sensor 18B. The reflective surface 46A can comprise a parabolic or spherical shape, and be configured for use with ultrasonic radiation 6. The transducer 46B is configured to convert acoustic signals into electrical energy. To this extent, transducer 46B can include a microphone 46C and a preamplifier 46D. Microphone 46C can be located such that its sensing area (e.g., diaphragm) is located at focal point FP. Microphone 46C can comprise any type of microphone including, but not limited to, a condenser microphone, an electret microphone, a micro-electro mechanical systems (MEMS) microphone, and/or the like. Preamplifier 46D can increase the output voltage of microphone 46C to a stronger, more usable level for further processing, e.g., by computer system 20. It is understood that preamplifier 46D also can provide an appropriate amount of analog anti-alias filtering in an embodiment.

Acoustic sensor 18B can hold transducer 46B in place using any solution. For example, acoustic sensor 18B can include a plurality of struts, each of which is attached to reflective antenna 46A and transducer 46B with a corresponding set of clamps. Acoustic sensor 18B can further include one or more protective elements. For example, microphone 46C can be covered by a protective screen. Further, transducer 46B can be enclosed within a housing configured to protect transducer 46B during outdoor operation. Transducer 46B can be operationally connected to one or more additional components, such as computer system 20, using any solution, e.g., a set of wires connected to preamplifier 46D, or the like.

Acoustic sensor 18B can be configured to enhance acoustic signals in a range of relevant frequencies and/or enhance acoustic signals received from a directional area corresponding to a location of a potential leak and/of flame source. For example, acoustic sensor 18B can be configured with a shape and focal length such that an acceptance angle of the microphone 46C is matched to the reflective surface 46A, thereby providing much higher gain for the relevant acoustic signals for the same physical sized antenna 46A. In some applications, the acoustic signals of an evaluated condition, such as a leak or a flame, can be much softer than ambient noises. In this case, acoustic sensor 18B can provide sufficient gain for the relevant frequencies and isolation from sounds emanating from other sources to enable accurate evaluation for the presence of the evaluated condition.

For high gain at large distances the aperture D and the efficiency q for the acoustic sensor 18B can be made as large as practical. For outdoor applications, a practical limit to the aperture D results from wind resistance considerations. In an illustrative embodiment, the reflective surface 46A is a spherical section of approximately twelve inches in diameter. To increase the efficiency factor q, several factors can be considered. For example, the transducer 46B and any corresponding support structure (e.g., struts), protective elements, and/or operational elements (e.g., wiring) should present a small cross section in the direction of the incident radiation 6 when compared with the wavelength of the incident radiation 6. For a typical leak, the frequency of maximum signal intensity is approximately twenty-five kHz, which corresponds to a wavelength of 0.53 inches. In an embodiment, the largest cross section of all the components relating to transducer 46B is approximately half of the wavelength, or approximately 0.25 inches.

A second factor influencing the efficiency factor η is cancellation due to unequal path lengths of the radiation 6 reflected into the transducer by the antenna. In particular, when the path lengths differ by a multiple of ½ of the wavelength of the incident radiation 6, cancellation due to destructive interference will occur. Since the radiation 6 from a leak is broadband in nature, wavelength-dependent cancellation is undesirable as the shape of the frequency spectrum will be modified. In an embodiment, a focal length of the reflective surface 46A is at least as large as the aperture of the reflective surface 46A. In such a configuration, wavelength-dependent cancellation is mitigated by making the path lengths of the reflected wavelengths closer to the same size. A transducer 46B suitable for measurement of ultrasonic radiation 6 typically is more sensitive to on axis signals than off axis signals. As a result, making the focal length of the reflective surface 46A at least as long as the aperture serves to reduce the maximum angle of the rays, improving the response.

In an illustrative embodiment, reflective surface 46A comprises a spherical shape comprising an aperture of approximately eight inches and a focal length of approximately eleven inches. Such a configuration can produce approximately a nineteen decibel gain at a frequency of thirty kHz. In this case, acoustic sensor 18B can enable the measurement of a leak as small as five grams/sec, which corresponds to a leak generated by eight pounds per square inch (psi) of pressure across an orifice 0.097 inches in diameter at a distance of approximately seventy-five feet. At seventy-five feet, the beamwidth is +/− seven degrees, thereby also providing good localization for the leak and/or flame source. Currently, a spherical shape reflective surface 46A is more readily available with large focal length to aperture ratios as compared to an equivalent gain parabolic shape. However, it is understood that embodiments of the invention can be implemented with an equivalent gain parabolic shape.

Figure 10A:
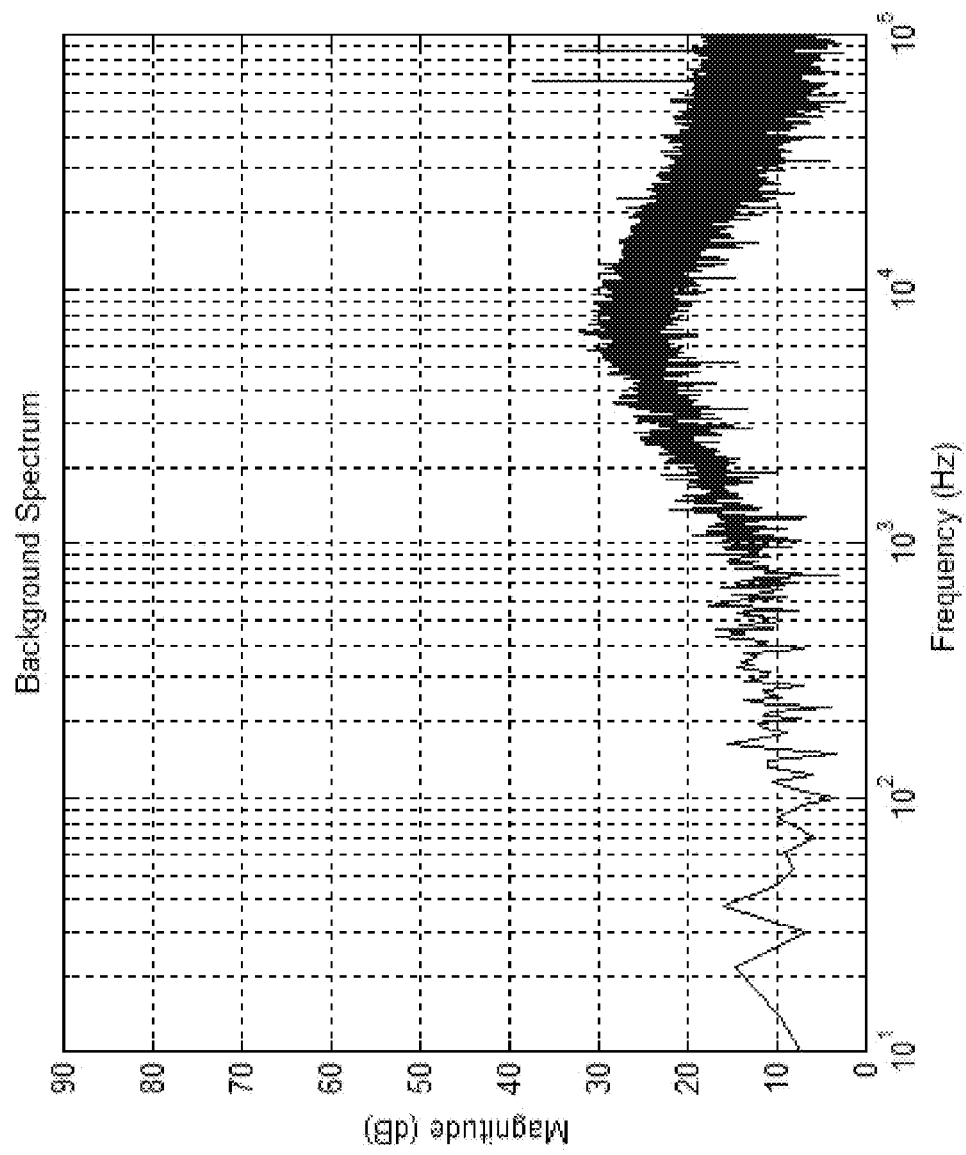
Figure 10B:
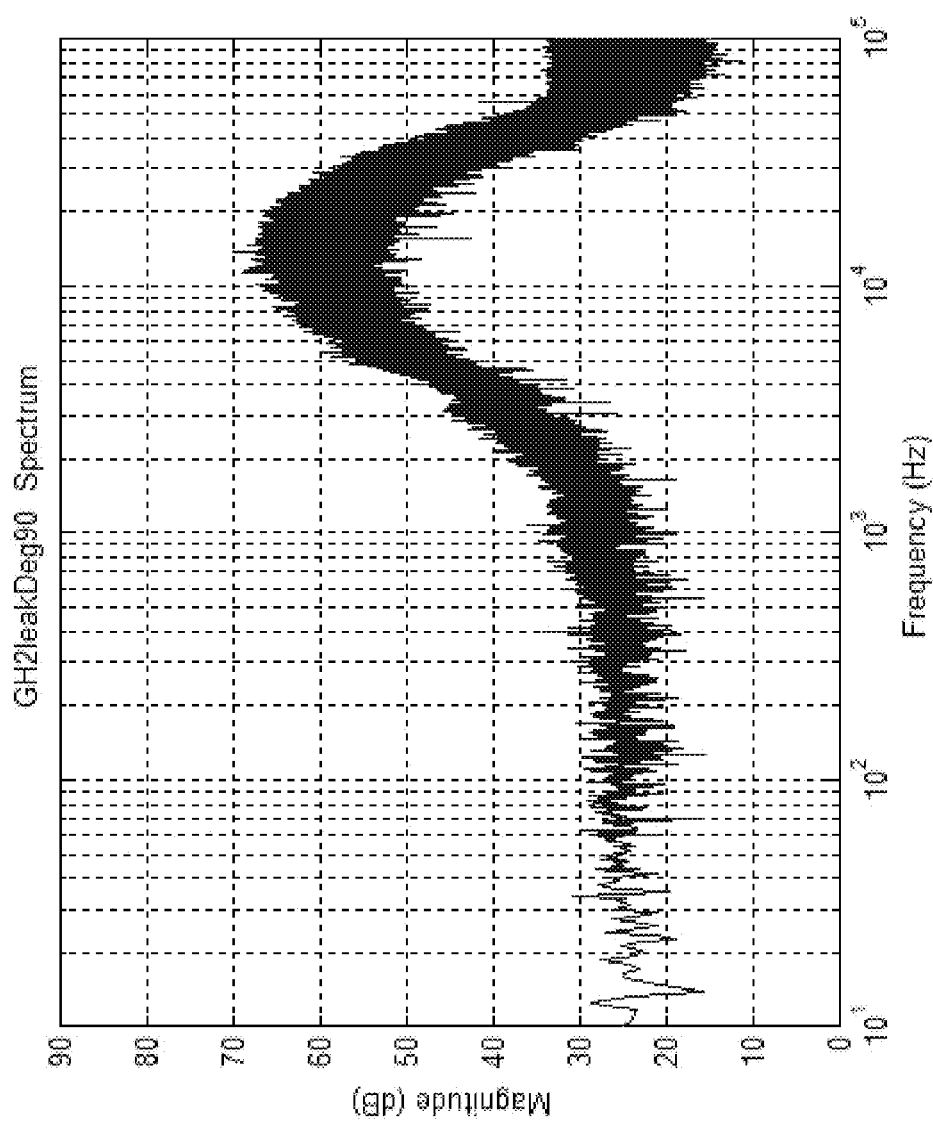

As described herein, the acoustic data acquired by sensing device 18B can be processed by computer system 20 (FIG. 1) to automatically detect a leak and/or flame of a pressurized fluid. To this extent, FIGS. 10A-10C show illustrative acoustic frequency spectra according to an embodiment. In particular, FIG. 10A shows the frequency spectrum for a typical outdoor city environment, which can serve as a baseline for evaluation of leaks and/or flames. FIG. 10B shows the frequency spectrum taken in the same setting as that of FIG. 10A, but with a leak of sixty psi hydrogen gas through an orifice of 0.097 inches located at a distance of seventy-five feet. FIG. 10C shows the frequency spectrum after the hydrogen gas leak was ignited to produce a steady flame. FIG. 10C shows a prominent additional broad peak centered in the audible spectrum at approximately two kHz. The magnitude of the sound was much louder in both audible and ultrasonic regions of the spectrum after ignition of the flame.

Figure 11:
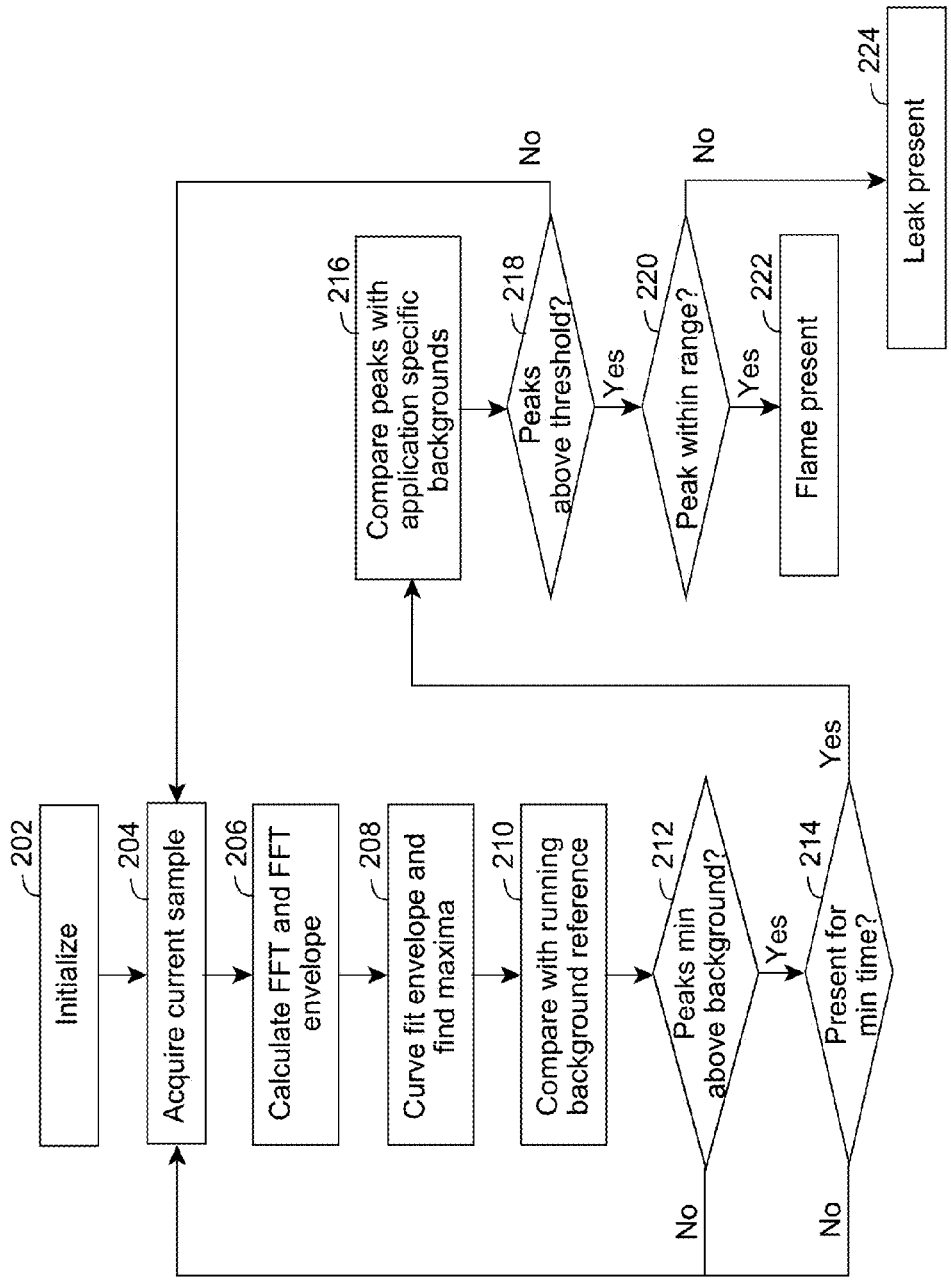
FIG. 11 shows an illustrative process for automatically identifying the presence of a leak and/or a flame in a monitored area using acoustic data according to an embodiment.

FIG. 11 shows an illustrative process for automatically identifying the presence of a leak and/or a flame in a monitored area using acoustic data according to an embodiment, which can be implemented by environment 10 (FIGS. 1 and 2). Referring to FIGS. 2 and 11, in action 202, computer system 20 can perform one or more initialization actions. For example, computing device 16A can initialize a counter stored as part of monitoring data 34A, which keeps track of a number of consecutive occurrences of acoustic peaks present in the acoustic data, which pass a sufficient number of tests for consideration as potential leaks or flames. In action 204, computing device 16B can obtain a current acoustic sample from one or more sensing devices 18B, and store it as raw monitoring data 34B. In an embodiment, the acoustic sample is optimized for acoustic data in the range of 10-40 kHz. However, the acoustic sample can include acoustic data for all frequencies between 10 Hz-100 kHz, or greater. Computing device 16B can filter the acoustic sample and store acoustic data corresponding to only those frequency ranges of value in determining whether a leak and/or flame may be present as monitoring data 34B. In an embodiment, a sample period can comprise approximately 0.5 seconds. However, it is understood that any sampling rate can be selected based on the application.

In action 206, computing device 16B can calculate the fast Fourier transform (FFT) and the FFT envelope for the acoustic sample using any solution, which can be stored as monitoring data 34B. In action 208, computing device 16B can curve fit the FFT envelope to identify specific maxima that are greater than one octave half power bandwidth using any solution. Computing device 16B can store the peak value and Q factor (the ratio of the peak value to the bandwidth in octaves) as monitoring data 34B for further processing.

In action 210, computing device 16A can compare the newly acquired monitoring data 34B, including the peak value and Q factor, with a stored running background of unremarkable spectra stored as monitoring data 34A. For example, the running background can comprise spectra data for various acoustic samples acquired over a recent time frame, e.g., ten minutes. In action 212, computing device 16A determines whether any peaks are present in the acoustic data that are a minimum amount (e.g., ten decibels) above the running background. If not, computing device 16A can add the newly acquired monitoring data 34 to the running background, and processing for the sample is complete. Additionally, when utilized computing device 16A can reset the counter described herein.

If one or more sufficient peaks are present in the acoustic data, in action 214, computing device 16A can determine whether the peak(s) have been present for a minimum amount of time. For example, computing device 16A can increment a counter and determine whether the counter exceeds a threshold number (e.g., three). If the peak(s) have not been present for a sufficient amount of time, processing for the current acoustic sample is complete. Otherwise, in action 216, computing device 16A can compare the peak(s) of the current acoustic sample to a library of application specific backgrounds. For the example, the library can include known transitory nature peaks that may occur in the particular environment in which sensing device 18B is installed.

In action 218, computing device 16A can determine whether any peaks above a threshold (e.g., 20 kHz) are present, which are not classified as background. For example, computing device 16A can compare the peak value and Q factor using an application-specific variance threshold. If one or more peaks are present, in action 220, computing device 16A can determine whether any non-background peak is present within a flame-only range of frequencies (e.g., 1-5 kHz). If so, in action 222, computing device 16A can determine that a flame is present. If not, in action 224, computing device 16A can determine that a leak is present. In either case, computing device 16A can provide data for use by one or more users 12 as described herein.

While the operations on acoustic and image data have been shown and described herein as being independently performed by computing devices 16A, 16B, it is understood that an embodiment of the invention can use fused acoustic and image data for the detection of a flame and/or leak. For example, acoustic data can be used to supplement the detection of a flame using image data and vice versa. In this case, the lack of any acoustic signal data indicating a flame or image data indicating a flame when the other sensor data indicates such a presence can be used to suppress what could otherwise be a false alarm, or supplement data provided for use by a user 12 (e.g., indicating that computer system 20 could not definitively determine whether a flame is present or not).

Additionally, it is understood that the particular acts and order of acts in the respective processing described in conjunction with computing devices 16A, 16B are only illustrative, and various alternatives are possible. Similarly, computing devices 16A, 16B are only illustrative of various implementations of computer system 20, which are capable of performing processing described herein. To this extent, it is understood that one or more of the actions described as being performed by computing device 16A or 16B can be performed by the other computing device 16A or 16B, an analog computing device, and/or the like.

Furthermore, it is understood that various features described herein may not be implemented for some implementations of environment 10. Likewise, some implementations of environment 10 can include additional features. For example, a number of sensing components 14, a configuration of each sensing device 18A (e.g., a lens) and/or 18B (e.g., necessity of a gain element), etc., can vary based on, for example, desired monitoring (e.g., monitoring for leaks only may not require any image sensing devices 18A, while monitoring for a flame only, such as to ensure that a desired flame remains present, may not require any acoustic sensing devices 18B), an indoor monitored area, an area providing limited access, a range of the monitored area, obstacles present within the monitored area, and/or the like.

Moreover, an embodiment of environment 10 can include self test functionality, e.g., when implemented in a critical application where sensor outputs and alarms are used for control and/or safety purposes. The self test functionality can insure faulty sensors do not result in expensive delays or compromise safety. For example, an ultrasonic signal source that generates a known ultrasonic signal can be placed in proximity to the acoustic sensing device 18B, e.g., in an area adjacent to a potential leak source. Similarly, a radiation source that generates a known electromagnetic signal can be located within the field of view of an imaging device. In either case, such a source can be activated during a self test and computer system 20 can compare the response of sensing device 18B with an expected result.

Environment 10 can be implemented as a portable (e.g., handheld) device, which is battery powered. For example, the portable device can be maneuvered by a robot and provide information to a remotely located user 12. Alternatively, the various outputs of computer system 20 can be provided to a monitor, headphones/speakers, alarm light or buzzer, and/or the like, which is integrated into the portable unit.

Sensing component 14 can be implemented as a single physical housing, which includes both an image and acoustic sensing device 18A, 18B. The sensing component 14 can be directed to acquire image and acoustic data from a direction in which one or more potential leak and/or flame sources are present. When environment 10 includes multiple sensing components 14, each sensing component 14 can be configured to monitor some or all of the area from a different viewpoint. In an embodiment, a sensing component 14 is mounted on a pole, and is configured to acquire image and acoustic data from a generally downward direction.

While shown and described herein as a method and system for monitoring an area, it is understood that aspects of the invention further provide various alternative embodiments. For example, in one embodiment, the invention provides a computer program fixed in at least one computer-readable medium, which when executed, enables a computer system to monitor an area. To this extent, the computer-readable medium includes program code, such as monitoring program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as monitoring program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for monitoring an area. In this case, a computer system, such as computer system 20 (FIG. 1 or 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

Environment 10 can be implemented to perform monitoring in a mission-critical location. In a specific application, environment 10 can be utilized to monitor a spacecraft launch complex. In this case, personnel are not allowed to be present when hydrogen operations, such as fuel loading, are occurring at the complex. Other illustrative applications include monitoring various facilities that store or use pressurized fluids that are prone to leakage, ignite easily, and/or burn with invisible flames, such as rocket launch and test facilities, alcohol production and storage facilities, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
   at least one sensing component, the at least one sensing component including:
      an imaging device, wherein the imaging device is configured to acquire image data for an area; and
      an acoustic device, wherein the acoustic device is configured to acquire acoustic data for the area; and
   a computer system including at least one computing device, wherein the computer system is configured to monitor the area by performing a method comprising:
      evaluating the image data for a presence of a flame of the at least one type of flame, wherein the evaluating the image data includes:
         identifying an object in the image data as a possible flame, wherein the object has a size exceeding a flame size detection limit;
         evaluating a plurality of properties of the object in the image data using a plurality of flame detection rules, wherein the plurality of properties include a plurality of properties relating to a shape of the object and a plurality of properties relating to motion of the object, wherein each flame detection rule evaluates the object as a flame or not a flame using at least one of the plurality of properties, and wherein each of the plurality of properties is evaluated using at least one flame detection rule; and
         evaluating the object as a flame in response to the plurality of flame detection rules indicating that the object is a flame for a minimum amount of time of at least one second; and
      evaluating the acoustic data for a presence of at least one of: the flame or a leak of a pressurized fluid.

2. The system of claim 1, the method further comprising providing monitoring data for use by a user based on the evaluated presence of at least one of: the flame or the leak, wherein the providing the monitoring data includes the computer system providing supplemental information for use by the user in response to an indication of a presence of a flame in one of the image data or the acoustic data and a lack of an indication of the presence of the flame in the other of the image data or the acoustic data.

3. The system of claim 1, wherein the imaging device comprises:

a camera sensitive to electromagnetic radiation having wavelengths up to approximately 1250 nanometers; and a low pass filter configured to filter electromagnetic radiation passing to the camera, wherein the low pass filter comprises a cut on wavelength of approximately 1150 nanometers.

4. The system of claim 1, wherein the type of flame comprises a hydrogen flame, and the at least one region comprises at least a portion of an infrared region between approximately 800 nanometers and approximately 1250 nanometers.

5. The system of claim 1, wherein the acoustic device is configured to enhance acoustic signals in a range of frequencies corresponding to the leak.

6. The system of claim 1, wherein the evaluating the object as a flame includes, for the image data corresponding to each of a plurality of image frames:
   identifying the object as a candidate flame in response to each of the plurality of flame detection rules indicating that the object is a flame;
   recording persistence data for the object indicating a number of consecutive frames that the object has been identified as a candidate flame; and
   evaluating a candidate flame as a flame in response to the persistence data indicating the object has been identified as a candidate flame for a number of consecutive frames corresponding to the minimum amount of time.

7. The system of claim 1, wherein the evaluating the acoustic data includes:
   determining whether the acoustic data includes any non-background peaks within a first range, wherein inclusion of at least one non-background peak within the first range indicates a presence of at least one of: a leak or a flame; and
   determining whether the acoustic data includes any non-background peaks within a second range in response to determining the inclusion of at least one non-background peak within the first range, wherein the inclusion of at least one non-background peak within the second range indicates the presence of a flame and no at least one non-background peak within the second range indicates the presence of a leak.

8. A system for monitoring an area, the system comprising:
   a computer system including at least one computing device, wherein the computer system is configured to monitor the area by performing a method comprising:
      evaluating image data for the area for a presence of a flame, wherein the evaluating includes:
         identifying an object in the image data as a possible flame, wherein the object has a size exceeding a flame size detection limit;
         evaluating a plurality of properties of the object in the image data using a plurality of flame detection rules, wherein the plurality of properties include a plurality of properties relating to a shape of the object and a plurality of properties relating to motion of the object, wherein each flame detection rule evaluates the object as a flame or not a flame using at least one of the plurality of properties, and wherein each of the plurality of properties is evaluated using at least one flame detection rule; and
         evaluating the object as a flame in response to each of the plurality of flame detection rules indicating that the object is a flame for a minimum amount of time.

9. The system of claim 8, wherein the method further comprises the computer system evaluating acoustic data for the area for a presence of at least one of: the flame or a leak of pressurized fluid.

10. The system of claim 9, further comprising:
   an imaging device, wherein the imaging device is configured to acquire image data for the area based on electromagnetic radiation having wavelengths only corresponding to at least one region of the electromagnetic spectrum in which electromagnetic radiation from an ambient light source is less than the electromagnetic radiation emitted by at least one type of flame; and
   an acoustic device, wherein the acoustic device is configured to acquire the acoustic data for the area and enhance acoustic signals in a range of frequencies corresponding to a leak of a pressurized fluid present in the area.

11. The system of claim 9, wherein the evaluating the acoustic data includes:
   the computer system evaluating the acoustic data for inclusion of any non-background peaks in a first range of frequencies, wherein inclusion of at least one non-background peak is indicative of a presence of a leak or a flame; and
   the computer system evaluating the acoustic data for inclusion of any non-background peaks in a second range of frequencies in response to determining the inclusion of at least one non-background peak within the first range, wherein inclusion of at least one non-background peak within the second range indicates the presence of a flame.

12. A method of monitoring an area, the method comprising:
   receiving, on a computer system including at least one computing device, image data for the area, wherein the image data is based on electromagnetic radiation having wavelengths only corresponding to at least one region of the electromagnetic spectrum in which electromagnetic radiation from an ambient light source is less than the electromagnetic radiation emitted by at least one type of flame produced by at least one type of fluid present in the area; and
   the computer system evaluating the image data for the presence of the flame of the at least one type of flame, wherein the evaluating the image data includes:
      the computer system identifying an object in the image data as a possible flame, wherein the object has a size exceeding a flame size detection limit;
      the computer system evaluating a plurality of properties of the object in the image data using a plurality of flame detection rules, wherein the plurality of properties include a plurality of properties relating to a shape of the object and a plurality of properties relating to motion of the object, wherein each flame detection rule evaluates the object as a flame or not a flame using at least one of the plurality of properties, and wherein each of the plurality of properties is evaluated using at least one flame detection rule; and
      the computer system evaluating the object as a flame in response to the plurality of flame detection rules indicating that the object is a flame for a minimum amount of time of at least one second.

13. The method of claim 12, wherein the at least one type of flame comprises a hydrogen flame, and the at least one region comprises at least a portion of an infrared region between approximately 800 nanometers and approximately 1250 nanometers.

14. The method of claim 12, wherein the computer system evaluating the object as a flame includes, for the image data corresponding to each of a plurality of image frames:
identifying the object as a candidate flame in response to each of the plurality of flame detection rules indicating that the object is a flame;
recording persistence data for the object indicating a number of consecutive frames that the object has been identified as a candidate flame; and
evaluating a candidate flame as a flame in response to the persistence data indicating the object has been identified as a candidate flame for a number of consecutive frames corresponding to the minimum amount of time.

15. The method of claim 12, further comprising:
receiving, on the computer system, acoustic data for the area;
the computer system evaluating the acoustic data for the presence of a leak of the fluid; and
providing monitoring data for use by the user based on the evaluated presence of the leak.

16. The method of claim 12, further comprising the computer system evaluating acoustic data for the presence of the flame, and wherein the evaluating the acoustic data includes:
evaluating the acoustic data for inclusion of any non-background peaks in a first range of frequencies, wherein inclusion of at least one non-background peak is indicative of a presence of a leak or a flame; and
evaluating the acoustic data for inclusion of any non-background peaks in a second range of frequencies in response to determining the inclusion of at least one non-background peak within the first range, wherein inclusion of at least one non-background peak within the second range indicates the presence of a flame.

17. The method of claim 16, further comprising:
the computer system extracting peak value data from the acoustic data for the area;
the computer system comparing the peak value data with running background spectra data; and
the computer system identifying any peak present in the peak value data exceeding the running background spectra data by a minimum amount as a non-background peak.

18. The method of claim 16, further comprising the computer system suppressing an indication of a presence of a flame in one of the image data or the acoustic data based on a lack of an indication of the presence of the flame in the other of the image data or the acoustic data.

19. The method of claim 16, further comprising the computer system providing monitoring data for use by a user based on the evaluated presence of the flame, wherein the providing the monitoring data includes the computer system providing supplemental information for use by the user in response to an indication of a presence of a flame in one of the image data or the acoustic data and a lack of an indication of the presence of the flame in the other of the image data or the acoustic data.

20. The method of claim 12, further comprising:
the computer system generating annotated image data of the area to emphasize a portion of the area visible in the image data in response to the evaluated presence of the flame; and
the computer system providing monitoring data for use by a user, wherein the monitoring data includes the annotated image data of the area when the evaluating indicates the presence of the flame.

* * * * *